United States Patent

Gill

[11] Patent Number: 5,329,303
[45] Date of Patent: Jul. 12, 1994

[54] COMPACT CHART RECORDER

[75] Inventor: Thomas Gill, Anaheim, Calif.

[73] Assignee: Transit Services, Inc., Long Beach, Calif.

[21] Appl. No.: 803,161

[22] Filed: Dec. 5, 1991

[51] Int. Cl.⁵ .................................. G01D 15/16
[52] U.S. Cl. .................... 346/140.1; 346/49; 346/136
[58] Field of Search .............. 346/49, 61, 29, 140 R, 346/136, 145, 33, 139 R

[56] References Cited

U.S. PATENT DOCUMENTS

| | | | |
|---|---|---|---|
| 1,772,605 | 8/1991 | Holland | 346/49 |
| 2,328,054 | 8/1943 | Chappell | |
| 2,384,515 | 9/1945 | Wise | |
| 2,437,242 | 3/1948 | Cole | |
| 2,770,517 | 11/1956 | Zabriskie | |
| 2,788,254 | 4/1957 | Nilsson | |
| 3,094,681 | 6/1963 | Kietz | |
| 3,175,161 | 3/1965 | Hackborn | |
| 3,348,230 | 10/1967 | Ross | |
| 3,778,840 | 12/1973 | Dahl | 346/140 X |
| 3,857,525 | 12/1974 | Gerber et al. | 242/57.1 |
| 4,062,021 | 12/1977 | Taylor | 346/136 |
| 4,216,478 | 8/1980 | Giedd et al. | 346/61 |
| 4,296,420 | 10/1981 | Dambach et al. | 346/140 R |
| 4,299,031 | 11/1981 | Collins et al. | 346/49 |
| 4,420,762 | 12/1983 | Andrews | 346/136 X |
| 4,512,079 | 4/1985 | LeBlond | 346/136 X |
| 4,536,770 | 8/1985 | Allen et al. | 346/29 |
| 4,564,852 | 1/1986 | Pelensky et al. | 346/140 R |
| 4,888,710 | 12/1989 | Venthem et al. | 346/49 X |

Primary Examiner—A. T. Grimley
Assistant Examiner—T. A. Dang
Attorney, Agent, or Firm—Arthur Freilich; Robert D. Hornbaker; Leon D. Rosen

[57] ABSTRACT

A chart recorder is described, of the type which includes a strip of pressure-markable chart paper (12, FIG. 1) that is slowly moved downpath past a marking station (30) where at least one stylus (32) presses against the chart strip to mark it, which is compact, reliable, and accurate. The marking station includes a first wide but thin belt (52) extending in a loop between a pair of rollers, with the stylus coupled to the belt so as the output of a temperature sensor turns the belt, the stylus moves across the width of the chart strip. A slider (82, FIG. 3) coupled to the stylus and belt, can slide along a lateral guide (90) that resists tilting of the slider, to thereby enable it to keep the stylus pressed against the chart strip. Where two styluses are used, a second independently driven belt is coupled to a second stylus with the second belt lying below the first one. A supply roll (20, FIG. 2) of chart strip can lie under a platen (26) against which the stylus presses, with the path of the chart strip extending upwardly from the storage station to the platen.

9 Claims, 2 Drawing Sheets

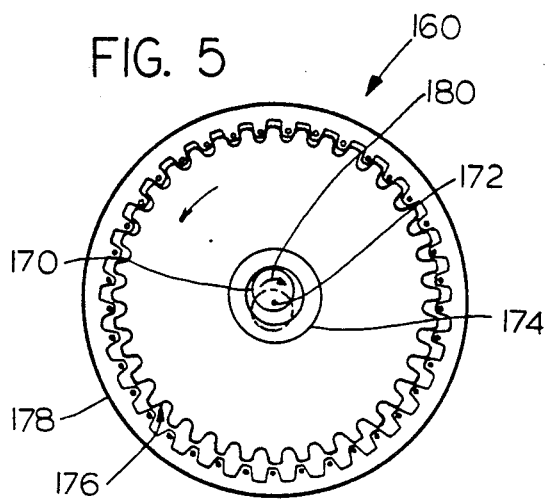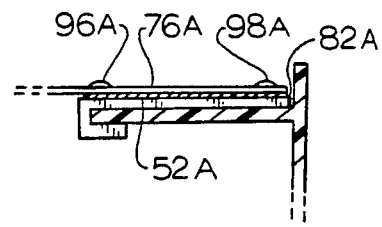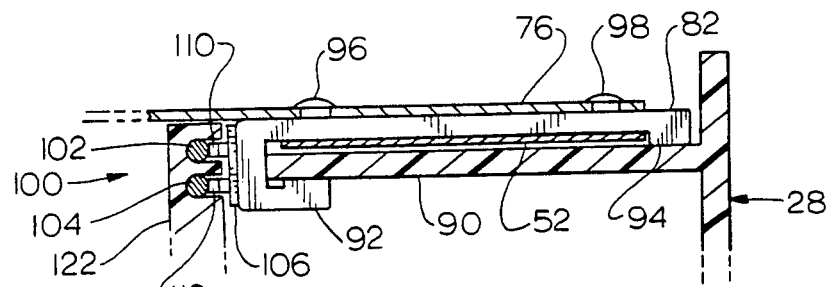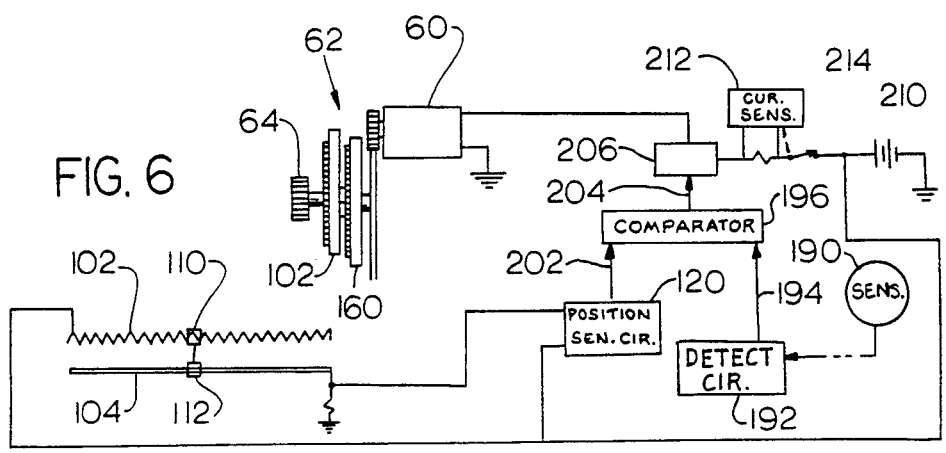

COMPACT CHART RECORDER

BACKGROUND OF THE INVENTION

Low cost strip chart recorders are often used to record the temperature of perishable cargo during its transportation. Such chart recorders must be constructed at low cost, and generally use pressure-markable chart paper. Previously, such recorders have included a bimetallic strip wound into a loose spiral, with one end fixed and the other end holding a stylus that presses against the chart strip, the bimetallic element moving the end of the stylus slowly across the width of the paper as the temperature changes. Such pressure-markable recorders have the disadvantage that they are not highly accurate and cannot record a temperature or other phenomenon sensed by an electronic sensor. Accurate electronic sensors are readily available at low cost and can be placed away from the recorder. A compact pressure marked chart recorder with one or more styluses that are precisely movable by an electronic sensor, and which was compact and of relatively low cost construction, would be of considerable value. For example, such a chart recorder could record temperature near the walls of a container as well as deep within the transported goods, to determine whether any part of the shipment has been exposed to a temperature above a maximum chill temperature. The chart strip may have a length of perhaps 20 inches, and may move at a rate of three eighths to two inches per day along its length.

SUMMARY OF THE INVENTION

In accordance with one embodiment of the present invention, a pressure-marked chart recorder is provided, which is compact and which can accurately record data from one or more electronic sensors. The chart recorder includes a belt extending in a loop between a pair of rollers and a first stylus with a rearward portion coupled to the belt and a forward portion that presses pressure-markable chart paper against a platen to mark the paper. An electronic sensor controls a motor that turns one of the rollers to move the stylus along the width dimension of the chart paper. A slider which is coupled to the rear portion of the stylus and the adjacent portion of the belt, can slide along a lateral guide that prevents pivoting of the slider to thereby enable the slider and the belt to resist torque on the stylus tending to lift it off the chart strip. The chart strip can move along a path towards the platen, which extends upwardly immediately up-path of the platen. This enables a supply of chart strip to be stored under the platen, or to extend under the stylus moving mechanism such as a belt or the like. A pair of belts that each extends in a loop between a pair of rollers and that is each individually moved by a separate electronic sensor, can be positioned with one belt below the other.

The novel features of the invention are set forth with particularity in the appended claims. The invention will be best understood from the following description when read in conjunction with the accompanying drawings.

BRIEF DESCRIPTION OF THE DRAWINGS

FIG. 4 is a view of a portion of the chart recorder of FIG. 2.

FIG. 5 is a simplified view of one of the "wobble" speed reducers of the chart recorder of FIG. 1.

FIG. 6 is a schematic diagram of the circuitry of the chart recorder of FIG. 1, and showing a portion of the gear train thereof.

FIG. 7 is a sectional view of a portion of a chart recorder constructed in accordance with another embodiment of the invention.

DESCRIPTION OF THE PREFERRED EMBODIMENTS

Figure 1:
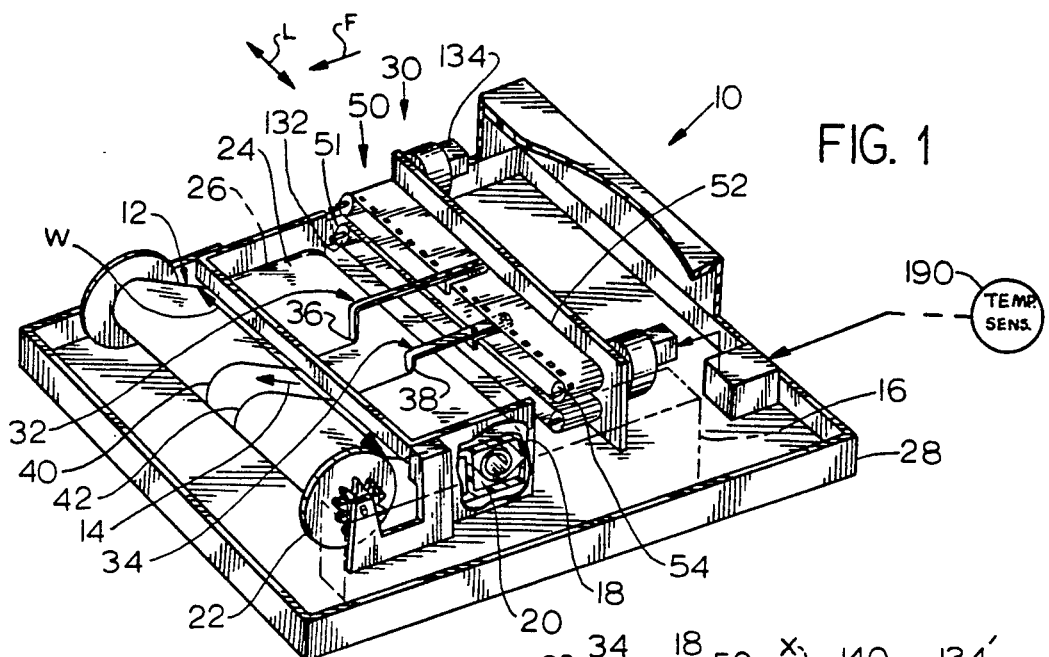
FIG. 1 is an isometric view of a chart recorder constructed in accordance with one embodiment of the present invention, with most of the upper part of the housing removed.

FIG. 1 illustrates a chart recorder 10 which includes a pressure-markable chart strip 12 that is moved along a chart path 14 by a transport 16, along a chart strip guideway 18 from a supply station 20 to a takeup station 22. A housing 28 supports and encloses the various parts of the recorder. A marking station 30 includes a platen 26 and a pair of styluses 32, 34 with marking parts 36, 38 that press down against a platen-supported part 24 of the chart strip. The styluses mark the chart strip to form traces 40, 42 on the chart strip. The transport 16 can be a spring-driven, electrically energized or otherwise energized device. The chart strip 12 can include a film of light-colored opaque wax that is readily scraped away from a dark paper base, or microscopic ink-filled capsules that are broken by pressure to color a paper base. It should be noted that while terms such as "horizontal" "down" etc are used herein to help in the description of the invention, the chart recorder and its parts can be used in any orientation with respect to gravity.

Figure 3:
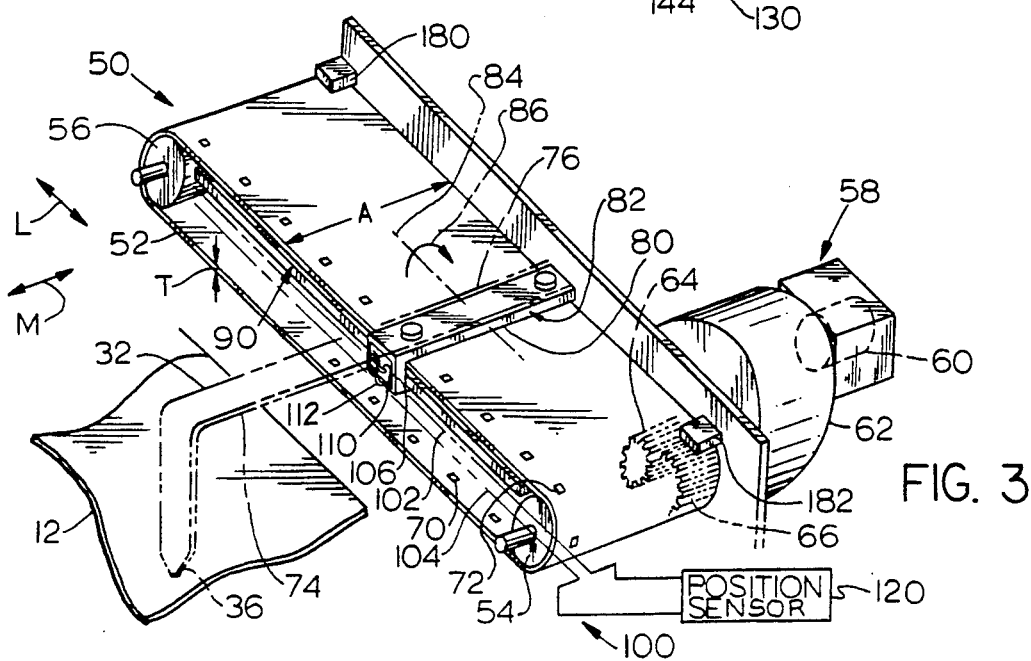
FIG. 3 is a partial isometric view of the marking station of the chart recorder of FIG. 1, with the upper stylus shown in phantom lines.

A pair of mechanisms 50, 51 are used to move each stylus along lateral directions L that are parallel to the width W of the chart strip 12, between locations spaced from each side edge of the chart strip. As shown in FIG. 3, the first mechanism 50 includes a belt 52 having a belt width A that is a plurality of times greater than the belt thickness T. A pair of rollers 54, 56 hold the belt in an elongated closed loop which extends in the horizontal lateral direction L. One of the rollers 54 is driven by a drive 58 that includes an electric motor 60 whose output passes through a gear train 62 to an output gear 64 that is engaged with gear teeth 66 formed at one end of the roller 54. The belt has sprocket holes 70, at least along the belt portion that will be engaged by the roller 54, and the roller 54 has sprockets 72 that engage the holes to drive the belt with precision.

The first stylus 32 has a forward portion 74 that includes the marking part 36 that marks the chart strip, and has a rear portion 76 that is coupled to a belt location 80. A slider 82 which is coupled to the stylus rear portion 76 and to the belt location 80, prevents pivoting of the thin belt about a lateral axis 84 in the direction indicated by arrow 86, due to the upward force applied to the forward portion of the stylus as it presses down against the chart strip. A lateral guide 90 fixed with respect to the rest of chart recorder housing, guides the slider in lateral movement while resisting pivoting of the slider. As shown in FIG. 4, the slider has parts 92, 94 that engage locations on the lateral guide 90 to prevent pivoting of the slider, while allowing the slider to slide laterally. The rear portion 76 of the stylus is coupled at locations 96, 98 to the slider, with the locations 96, 98 spaced apart along most of the width of the belt to stabilize the position of the stylus rear portion. FIG. 7 illustrates another arrangement where the belt 52A is sandwiched between the slider 82A and the stylus rear portion 76A, so the slider is coupled to the stylus through the belt (and through a pair of posts 96A, 98A).

While the drive 58 (FIG. 3) can turn the belt to move the stylus laterally, high precision of stylus lateral movement require a feedback mechanism. A rotary potentiometer or the like could be connected to the drive roller 54, but such a potentiometer adds bulk and adds considerable cost. Applicant uses a position sensing apparatus 100 that senses the position of the stylus along the width of the chart strip. The position sensing apparatus includes a pair of elongated conductors 102, 104 extending in the lateral direction beside the slider 82. As also shown in FIG. 4, the slider carries a shorting device 106 with a pair of connected contacts 110, 112. Each contact 110, 112 is engaged in wiping contact with a different one of the conductors 102, 104. One of the conductors 102 has a moderately high resistance along its length, with the resistance preferably being a plurality of hundreds of ohms between its opposite ends. Applicant has constructed a chart recorder using a conductor 102 having a resistance of 10 kilohms per inch. The other conductor 104 is a highly conductive wire, although it also could have high resistance. As shown in FIG. 3, applicant connects a position sensor 120 to ends of the conductors 102, 104, with the resistance between the conductor ends being dependent upon the position at which the conductors 102, 104 are connected together, and therefore on the position of the slider. The moderately high resistance conductor 102 can be formed from a long length of resistance wire that is wound in a very long but tight helix around a thin wire core. The resistance wire may be initially coated with insulation, and one side of the insulation is removed to allow the contact 110 to engage it. The conductors lie in slots formed in a holder 122 (FIG. 4) of the housing. The conductors are available at low cost, and enable precision determination of the slider movement and therefore of the stylus at any given time.

Figure 2:
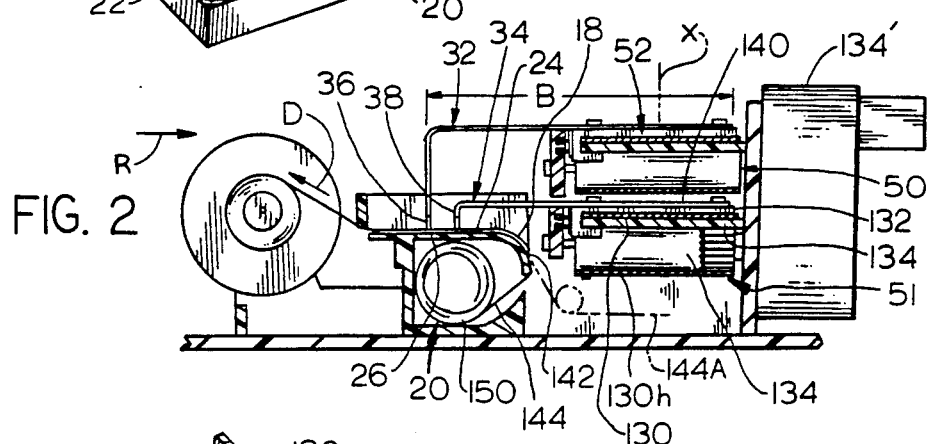
FIG. 2 is a sectional view of the chart recorder of FIG. 1.

As shown in FIGS. 1 and 2, the two mechanisms 50, 52 for moving the two styluses 30, 34 are of similar construction, with each including a belt 52, 130, each extending in a closed loop about a pair of rollers. The lower mechanism 51 includes a drive roller 132 at a lateral side of the housing opposite the drive roller 54 of the upper mechanism, with the drive roller 132 being rotated by another drive 134'. Applicant positions the second or lower belt 130 so at least part of it and preferably all of it lies directly below the first or upper belt 52. The rear portion 140 of the second stylus 32 lies below the level of the rear portion of the first stylus, and the marking part 38 of the second stylus 32 lies rearward (along direction R) of the marking part 36 of the first stylus. This allows the first stylus 36 to traverse most of the width of the chart strip without interference with the second stylus. By positioning the belts and styluses with one below the other, each stylus has about the same length in the forward-rearward direction, and yet wide belts can be used to accurately position the styluses and resist torque resulting from the downward force that must be applied by the tip of the stylus to the chart strip.

Applicant prefers to use a belt of a width A that is more than five times its thickness T to minimize pivoting of the stylus about a vertical axis X. It would be possible to use a pair of polished rods to guide the slider and prevent pivoting, but the cost would be many times greater than the use of a wide belt rather than a narrower one. In a chart record that applicant has constructed, of the construction shown, the belt 52 was constructed of 0.015 inch thick steel sheet shim stock, and the belt had a width A along a longitudinal direction M, of about one inch. The strip chart had a width W (FIG. 1) of three inches. The front-to-rear length B of the stylus was about 2.5 inches, which is less than five times the belt width.

As shown in FIG. 2, the lower mechanism 51 which moves the lower stylus 34 includes a lower belt 130 that is coupled to a lower slider 132 that slides along a lower lateral guide 134 of the housing. The lower half 130$h$ of the lower belt 130 lies below the level of the upper surface 24 of the platen 26 against which the styluses press the chart strip. Applicant moves the chart strip from its supply station 20 along an up-path path portion 142 that extends at least partially upwardly to the platen. The up-path chart strip portion 144 is the part that lies up-path from the styluses. It would be possible to mount the supply station 20 rearward of the belts such as belt 130 and to guide the chart strip along a path 144A under the belts and then upwardly to the platen. Applicant prefers to use the space under the platen 26 to store much of the up-path portion of the chart strip at the beginning of recording. Applicant stores the supply portion 150 of the chart strip as a loose roll, which moves largely upwardly along the path portion 142 to the level of the platen upper surface 24.

As indicated in FIG. 6, the gear train 62 which is driven by the motor 60 and which drives an output gear 64 that turns the sprocket roller, includes two "wobble-type" gear reducers 160, 162. Each wobble-type gear reducer such as 160 is shown in FIG. 5. This type of gear reducer is known. An input shaft 170 rotates about an offset axis 172, and bears against the inside of a hub 174 of a reduced speed inner gear 176. The inner gear 176 lies within a fixed outer gear 178. As the input shaft 170 moves in a circle in direction 180 about the axis 172, it presses the inner gear in different directions to cause teeth of the inner gear 176 to roll about the inside teeth of the outer gear 178. After every rotation of the input shaft 170 in direction 180, the inner gear 176 turns by the space of one tooth in the direction 182. In the case of an outer gear 178 having thirty seven teeth, the inner gear turns one thirty-seventh of a turn for every turn of the shaft 170. Two of such wobble-type gear reducers connected in series, reduce the shaft speed by over one thousand to one.

Wobble-type gear reducers of the type shown in FIG. 5 produce a torque increase which is much less than their speed reduction. Thus, for example, if the two wobble-type gear reducers produce a gear reduction of 1000:1, the increase in torque may be perhaps only 100:1. Applicant finds this highly advantageous, in that if the slider reaches the end of its excursion, and cannot move any further, then the only moderate torque tending to turn the belt will not "tear up" the mechanism. FIG. 3 shows a pair of stops 180, 182 that lie in the path of the slider 82 to limit its lateral excursion. Excursions beyond the stops could occur if temperatures above or below the expected range were to occur. The stops 180, 182 prevent excessive belt rotation that could damage the mechanism. When the slider hits a stop such as 180, the current applied to the motor 60 increases greatly, and this current increase is detected and the motor is stopped. However, because of the large speed reduction, it may take perhaps one half minute after the slider 82 abuts a stop, before the motor current has increased sufficiently for detection of overload and stopping of current. The moderate torque prevents damage to the mechanism during this period of perhaps one half minute.

As shown in FIG. 6, applicant connects a sensor 190 such as a temperature sensor, to a detect circuit 192 whose output on line 194 represents the temperature or other phenomenon that has been sensed. The output on line 194 is delivered to a comparator 196. The position sensing circuit 120 which detects the position of the stylus, has an output 202 which is also delivered to the comparator 196. The comparator compares the signal on line 194 representing the temperature to be recorded, with the output on line 202 representing the position of the stylus and therefore the temperature being marked on the graph, and produces an output on line 204 representing the difference. The output on line 204 is a difference signal that controls a circuit 206 which delivers current from a battery pack 210 to the motor 60 to adjust the stylus position. A current sensor 212 senses current flow to the motor, and when the current exceeds a predetermined level indicating that the slider has hit a stop, the current sensor 212 opens a switch 214 to stop current flow for a predetermined period such as five minutes, after which the switch is closed and current can begin to flow again; if the current again reaches a high level, the switch 214 is opened again.

Thus, the invention provides a low cost chart recorder of the type that uses a pressure-markable chart strip, which is compact and enables accurate recording of data on the chart strip. The chart recorder includes a belt extending parallel to the width of the chart strip and coupled to an inner portion of the stylus to move it laterally. A slider coupled to the belt and stylus rear portion, slides along a fixed lateral guide that guides the slider in movement and enables it to resist torque applied by the stylus whose front portion presses with considerable force down against the chart strip. The recorder can include two of such belts and associated sliders, one lying below the other. With part of the chart strip lying on a platen where the stylus presses down against it, an up-path portion of the chart strip extends at least partially upwardly to the platen from a level therebelow. A supply station for a supply of the chart strip, can lie directly below the platen. The position of the stylus can be monitored by a pair of conductors extending parallel to the slider, one having a high resistance, and with the slider having a shorting device that connects locations on the two conductors adjacent where the slider lies at any given time. A motor whose output is used to move the belt, can be connected through a gear train that includes one or more wobble-type gear reducers, to produce a large reduction in movement but a less than corresponding increase in torque. This avoids damaging the mechanism when the slider abuts one of two stops at the ends of its limits of travel.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A low cost pressure-markable chart recorder that includes a housing, a marking station with a platen on said housing, a pressure markable chart strip having a width and having a length extending along a chart path between supply and takeup stations past said platen, with said chart path extending in a longitudinal direction at said platen, and a transport which is mounted on said housing and which moves said chart strip along said path, characterized by:

said marking station includes a first belt with a portion extending in a lateral direction parallel to said width of said chart strip, a first stylus with a forward stylus portion that includes a marking part that is spaced in said longitudinal direction from said belt and that presses in a downward direction toward a portion of said chart strip that lies on said platen and with a rear stylus portion lying generally rearward of said forward portion, said rear stylus portion coupled to a part of said belt portion, and a belt-moving mechanism that moves said belt part in said lateral direction to thereby move said stylus in said lateral direction across at least part of the width of said chart strip;

said marking station includes a first slider coupled to said belt part and to said rear stylus portion;

said housing includes a first lateral guide that guides said first slider in movement along said lateral direction and that resists pivoting of said guide and thereby also said stylus about an axis extending in said lateral direction to thereby keep said stylus marking part pressed toward said platen, said lateral guide engaging said first slider at locations spaced apart along said longitudinal direction.

2. The chart recording described in claim 1 wherein: said stylus has a length along said longitudinal direction, said belt has a thickness, and said belt has a width along said longitudinal direction which is more than five times the thickness of said belt and with the width of said belt being at least one fifth the length of said stylus along said longitudinal direction.

3. A low cost pressure-markable chart recorder comprising:

a marking station;

a supply station;

a takeup station;

a chart strip of pressure markable material extending along a chart path past said marking station between said supply and takeup stations, said chart strip having a width;

a transport which moves said chart strip downpath along said chart path from said supply station to said takeup station;

said marking station includes a first stylus and a second stylus that each have a forward portion with a marking part that can press against said chart strip to make it and that each have a rear portion, and a first mechanism and a second mechanism that respectively move said rear portion of said first stylus and said rear portion of said second stylus substantially parallel to the width of said chart strip;

each of said mechanisms includes a wide but thin belt whose width is a plurality of times greater than its thickness, and a pair of rollers holding the belt in an elongated closed loop extending substantially parallel to said chart strip width, with one of said rollers being driven to move the belt along its loop, with said rear portion of each of said styluses coupled to a corresponding one of said belts so as the belt is moved along its loop the corresponding stylus is moved along said chart strip width, with the rear portion of each stylus coupled to belt locations that are spaced along at least about half of the width of the corresponding belt;

said mechanism positioned with a first of said belts coupled to said first stylus and lying directly above at least part of a second of said belts, and said first stylus marking part lies downpath of said second stylus marking part.

4. The chart recorder described in claim 3 wherein:
said supply station lies beneath the level of marking parts of said styluses, and also lies forward of said belts of said mechanisms.

5. A low cost pressure-markable chart recorder comprising:
a chart strip of pressure markable paper which has a width, thickness and length;
a platen with a substantially horizontal chart supporting portion, said chart strip having a portion lying on said platen portion;
supply and takeup stations, a guideway that guides said chart strip along a chart path between said stations, and a transport that moves said chart strip along said chart path, said chart strip lying in a supply roll at said supply station and said supply station being capable of holding a roll of predetermined maximum diameter;
a marking apparatus which includes a stylus with a marking part lying over said platen portion to apply downward force to a small area of said chart strip to mark it, and a mechanism that moves said stylus to move said marking part at least partially along the width of said chart paper;
said supply roll lies immediately below the level of said platen portion so the space between them is no more than the diameter of said roll of predetermined maximum diameter, and said chart path includes an up-path portion extending between said supply station and said platen portion with said up-path portion including a primarily upwardly-extending part extending to the level of said platen portion.

6. The chart recorder described in claim 5 wherein:
said supply station lies directly below said platen.

7. A low cost pressure-markable chart recorder that includes a housing, a marking station with a platen on said housing, a pressure markable chart strip having a width and having a length extending along a chart path between supply and takeup stations past said plate, and a transport which is mounted on said housing and which moves said chart strip along said path, characterized by:
said marking station includes a first belt with a portion extending in a lateral direction parallel to said width of said chart strip, a first stylus with a forward stylus portion that includes a marking part that presses in a downward direction toward a portion of said chart strip that lies on said platen and with a rear stylus portion lying generally rearward of said forward portion, said rear stylus portion coupled to a part of said belt portion, and a belt-moving mechanism that moves said belt part in said lateral direction to thereby move said stylus in said lateral direction across at least part of the width of said chart strip;
said marking station includes a first slider coupled to said belt part and to said rear stylus portion;
said housing includes a first lateral guide that guides said first slider in movement along said lateral direction and that resists pivoting of said guide and thereby also said stylus about an axis extending in said lateral direction to thereby keep said stylus marking part pressed toward said platen;
said marking station includes a second belt that lies above said first belt with a second belt portion extending in said lateral direction, a second stylus having a forward portion and a rearward portion with said rearward portion coupled to a part of said second belt portion, a second belt-moving mechanism that moves said second belt part in said lateral direction, a second slider coupled to said second belt portion, and a second lateral guide that guides said second slider in movement along said lateral direction and resists pivoting of said second guide;
said platen extends horizontally, and said chart path has an up-path portion lying at a level below said platen and a second path portion that extends primarily upwardly to the level of said platen.

8. A low cost pressure-markable chart recorder that includes a housing, a marking station with a platen on said housing, a pressure markable chart strip having a width and having a length extending along a chart path between supply and takeup stations past said plate, and a transport which is mounted on said housing and which moves said chart strip along said path, characterized by:
said marking station includes a first belt with a portion extending in a lateral direction parallel to said width of said chart strip, a first stylus with a forward stylus portion that includes a marking part that presses in a downward direction toward a portion of said chart strip that lies on said platen and with a rear stylus portion lying generally rearward of said forward portion, said rear stylus portion coupled to a part of said belt portion, and a belt-moving mechanism that moves said belt part in said lateral direction to thereby move said stylus in said lateral direction across at least part of the width of said chart strip;
said marking station includes a first slider coupled to said belt part and to said rear stylus portion;
said housing includes a first lateral guide that guides said first slider in movement along said lateral direction and that resists pivoting of said guide and thereby also said stylus about an axis extending in said lateral direction to thereby keep said stylus marking part pressed toward said platen;
said marking station includes a position sensing apparatus that senses the position of said stylus along the width of said chart strip, including first and second elongated conductors extending in said lateral direction beside said slider, a shorting device mounted on said slider and having a pair of connected contacts each engaged in wiping contact with a different one of said conductors, with at least said first conductor having a resistance of a plurality of hundreds of ohms between its opposite ends, and a circuit which passes current in a current path from one end of said first conductor and through said shorting device and through said second conductor and which measures the resistance along said current path, to thereby determine the position of said stylus along the width of said chart strip.

9. A low cost pressure-markable chart recorder that includes a housing, a marking station with a platen on said housing, a pressure markable chart strip having a width and having a length extending along a chart path between supply and takeup stations past said plate, and a transport which is mounted on said housing and which moves said chart strip along said path, characterized by:

said marking station includes a first belt with a portion extending in a lateral direction parallel to said width of said chart strip, a first stylus with a forward stylus portion that includes a marking part that presses in a downward direction toward a portion of said chart strip that lies on said platen and with a rear stylus portion lying generally rearward of said forward portion, said rear stylus portion coupled to a part of said belt portion, and a belt-moving mechanism that moves said belt part in said lateral direction to thereby move said stylus in said lateral direction across at least part of the width of said chart strip, said marking station including at least one stop that limits lateral movement of said belt;

said belt moving mechanism includes an electric motor, a voltage source connected to said motor, a drive roller engaged with said belt to drive it, and a speed reduction gear train that couples said motor and drive roller, wherein said gear train produces a reduction of a plurality of hundreds to one;

a stop sensor that senses when said belt movement has been limited by said stop including means for sensing a large rise in current flowing from said voltage source to said motor;

said gear train includes at least one wobble gear type device which includes a first gear with teeth at its periphery lying within a second gear having a ring-shaped periphery with teeth on its inside engaged with those of said first gear, wherein said first gear has one less tooth than said first gear and one of said gears moves in a small circle about the axis of the other of said gears, whereby to limit torque transmission to prevent gear train breakage before said stop sensor stops energizing said motor.

* * * * *